(12) United States Patent
Chang et al.

(10) Patent No.: US 12,349,148 B2
(45) Date of Patent: Jul. 1, 2025

(54) METHOD AND APPARATUS FOR OPERATING FRAME IN FACTORY AUTOMATION SYSTEM

(71) Applicant: ELECTRONICS AND TELECOMMUNICATIONS RESEARCH INSTITUTE, Daejeon (KR)

(72) Inventors: Kap Seok Chang, Daejeon (KR); Yong Sun Kim, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 850 days.

(21) Appl. No.: 17/518,455

(22) Filed: Nov. 3, 2021

(65) Prior Publication Data

US 2022/0150873 A1    May 12, 2022

(30) Foreign Application Priority Data

Nov. 6, 2020  (KR) .......... 10-2020-0148148
Oct. 18, 2021  (KR) .......... 10-2021-0138770

(51) Int. Cl.
*H04W 72/23*    (2023.01)
*H04W 48/16*    (2009.01)
*H04W 72/0446*  (2023.01)
*H04W 72/21*    (2023.01)
*H04W 74/0833*  (2024.01)

(52) U.S. Cl.
CPC .......... *H04W 72/23* (2023.01); *H04W 48/16* (2013.01); *H04W 72/0446* (2013.01); *H04W 72/21* (2023.01); *H04W 74/0833* (2013.01)

(58) Field of Classification Search
CPC . H04W 72/23; H04W 48/16; H04W 72/0446; H04W 72/21; H04W 74/0833; H04W 72/20
See application file for complete search history.

(56) References Cited

U.S. PATENT DOCUMENTS

| | | |
|---|---|---|
| 9,722,760 B2 * | 8/2017 | Stern-Berkowitz ......... H04L 1/1822 |
| 10,097,260 B2 | 10/2018 | Hosseini et al. |
| 10,764,790 B2 | 9/2020 | Kwon et al. |

(Continued)

FOREIGN PATENT DOCUMENTS

WO    2017055309 A1    4/2017

OTHER PUBLICATIONS

Aamir Mahmood et al., "Over-the-Air Time Synchronization for URLLC: Requirements, Challenges and Possible Enablers", Conference: 2018 15th International Symposium on Wireless Communication Systems (ISWCS), Aug. 2018.

(Continued)

*Primary Examiner* — Brian T O Connor
(74) *Attorney, Agent, or Firm* — Rabin & Berdo, P.C.

(57) ABSTRACT

An operation method of a terminal in a communication system may comprise: receiving, from a base station, information on a command period of a sub-frame, information on an action period of the sub-frame, and information on a report period of the sub-frame; receiving, from the base station, a command in the command period; performing an action according to the received command in the action period; and reporting, to the base station, a result according to the action in the report period.

19 Claims, 9 Drawing Sheets

(56) References Cited

U.S. PATENT DOCUMENTS

| | | | |
|---|---|---|---|
| 11,997,039 B2* | 5/2024 | Xiong | H04L 5/0051 |
| 12,021,772 B2* | 6/2024 | Shin | H04W 72/0446 |
| 12,052,674 B2* | 7/2024 | Kim | H04L 5/0051 |
| 2019/0190635 A1 | 6/2019 | Goel et al. | |
| 2019/0289478 A1* | 9/2019 | Hosseini | H04L 1/187 |
| 2020/0021410 A1 | 1/2020 | Choi et al. | |
| 2020/0178239 A1 | 6/2020 | Yi et al. | |
| 2020/0288463 A1 | 9/2020 | Lee et al. | |
| 2023/0337287 A1* | 10/2023 | Yang | H04W 16/28 |

OTHER PUBLICATIONS

Aamir Mahmood et al., "Time Synchronization in 5G Wireless Edge: Requirements and Solutions for Critical-MTC", IEEE Communications Magazine—Jun. 2019.

Andreas Frotzscher et al., "Requirements and current solutions of wireless communication in industrial automation", ICC'14—W8: Workshop on 5G Technologies, Jun. 2014.

* cited by examiner

METHOD AND APPARATUS FOR OPERATING FRAME IN FACTORY AUTOMATION SYSTEM

CROSS-REFERENCE TO RELATED APPLICATIONS

This application claims priority to Korean Patent Applications No. 10-2020-0148148, filed on Nov. 6, 2020, and No. 10-2021-0138770 filed on Oct. 18, 2021 with the Korean Intellectual Property Office (KIPO), the entire contents of which are hereby incorporated by reference.

BACKGROUND

1. Technical Field

The present disclosure relates to a frame operation technique in a communication system, and more particularly, to a frame operation technique in a factory automation system supporting a mechanism of command-action-report performed at every cycle time.

2. Related Art

In order to process wireless data increasing rapidly, a communication system (e.g., new radio (NR) communication system) using a higher frequency band (e.g., frequency band of 6 GHz or above) than a frequency band (e.g., frequency band of 6 GHz or below) supported by a long-term evolution (LTE) or LTE-A communication system is being considered. The NR communication system may support a frequency band of 6 GHz or above as well as a frequency band of 6 GHz or below, and may support various communication services and scenarios compared to the LTE communication system. For example, the usage scenarios of the NR communication system may include enhanced Mobile BroadBand (eMBB), Ultra-Reliable Low-Latency Communication (URLLC), massive Machine Type Communication (mMTC), and the like.

Meanwhile, a factory automation system may be one of difficult use cases of the URLLC, which requires mission-critical communications having stringent reliability and latency requirements. The factory automation system often involves real-time interaction between multiple wireless devices, and may require technologies for ultra-precise absolute time synchronization (ATS) between the devices based on a common time reference. In order for such the factory automation system to achieve the ATS between wireless devices, an ultra-precise ATS mechanism may be required that goes beyond the conventional timing-based frame alignment between wireless devices and a base station. On the other hand, an ATS procedure for the existing LTE-time division duplex (TDD) and radio coordination in a small cell are limited only to synchronization between base stations. In order for the factory automation system to enable time synchronization between wireless devices, it may be required to standardize an additional physical layer frame structure and numerologies therefor in the 5G URLLC specifications.

SUMMARY

Accordingly, exemplary embodiments of the present disclosure are directed to providing frame operation methods and apparatuses for a factory automation system supporting a mechanism of command-action-report performed at every cycle time in a mission-critical application based on an ultra-precise absolute time synchronization technique.

According to a first exemplary embodiment of the present disclosure, an operation method of a terminal in a communication system may comprise: receiving, from a base station, information on a command period of a sub-frame, information on an action period of the sub-frame, and information on a report period of the sub-frame; receiving, from the base station, a command in the command period; performing an action according to the received command in the action period; and reporting, to the base station, a result according to the action in the report period.

The operation method may further comprise: receiving, from the base station, downlink control data for access in a downlink period of the action period; and transmitting uplink control data for accessing the base station based on the downlink control data in an uplink period of the action period.

The uplink period may include at least one first type slot, a transmission direction switching period, and at least one second type slot, the transmission direction switching period may be configured as a guard period, the downlink period may include at least one first type slot, and a slot length of the first type slot may be longer than a slot length of the second type slot.

The downlink control data may include at least one of first system control information, cell search information, a physical layer signal, or information for random access.

The first system control information may include at least one of a bandwidth, a number of transmission antennas, resource scheduling information of a downlink physical channel, resource scheduling information of an uplink physical channel, time information for absolute synchronization, information on a frame duration, information on a cycle time, and an application identifier (ID).

The uplink control data may include at least one of second system control information, random access information, and a physical layer signal.

The command period may include at least one slot, the action period may include at least one slot and at least one guard period for transmission direction switching, and the report period may include at least one slot.

The command period may include at least one first type slot, the action period may include at least one first type slot, at least one second type slot, and at least one guard period for transmission direction switching, the report period may include at least one first type slot, and a slot length of the first type slot may be longer than a slot length of the second type slot.

A guard period may be configured in a start region or an end region of the sub-frame.

The operation method may further comprise: receiving random access information from the base station in a downlink period of the action period; and transmitting a random access preamble selected based on the random access information to the base station in an uplink period of the action period.

The operation method may further comprise: receiving, from the base station, a synchronization signal for acquisition of time/frequency synchronization in a downlink period of the action period; receiving, from the base station, a synchronization signal for acquisition of a cell identifier (ID) in the downlink period of the action period; and performing downlink synchronization using the synchronization signal for acquisition of time/frequency synchronization and the synchronization signal for acquisition of a cell ID.

According to a second exemplary embodiment of the present disclosure, an operation method of a base station in a communication system may comprise: transmitting, to a terminal, information on a command period of a sub-frame, information on an action period of the sub-frame, and information on a report period of the sub-frame; transmitting, to the terminal, a command in the command period of the sub-frame; and receiving, from the terminal, a report on a result of an action according to the command, in the report period of the sub-frame.

The operation method may further comprise: transmitting, to the terminal, downlink control data for access of the terminal in a downlink period of the action period; and receiving, from the terminal, uplink control data for access based on the downlink control data in an uplink period of the action period.

The downlink control data may include at least one of first system control information, cell search information, a physical layer signal, or information for random access, and the uplink control data includes at least one of second system control information, random access information, and a physical layer signal.

According to a third exemplary embodiment of the present disclosure, a terminal may comprise: a processor; a memory electronically communicating with the processor; and instructions stored in the memory, wherein when executed by the processor, the instructions cause the terminal to: receive, from a base station, information on a command period of a sub-frame, information on an action period of the sub-frame, and information on a report period of the sub-frame; receive, from the base station, a command in the command period; perform an action according to the received command in the action period; and report, to the base station, a result according to the action in the report period.

The instructions may further cause the terminal to: receive, from the base station, downlink control data for access in a downlink period of the action period; and transmit uplink control data for accessing the base station based on the downlink control data in an uplink period of the action period.

The uplink period may include at least one first type slot, a transmission direction switching period, and at least one second type slot, the transmission direction switching period may be configured as a guard period, the downlink period may include at least one first type slot, and a slot length of the first type slot may be longer than a slot length of the second type slot.

The command period may include at least one slot, the action period may include at least one slot and at least one guard period for transmission direction switching, and the report period may include at least one slot.

The command period may include at least one first type slot, the action period may include at least one first type slot, at least one second type slot, and at least one guard period for transmission direction switching, the report period may include at least one first type slot, and a slot length of the first type slot may be longer than a slot length of the second type slot.

According to the exemplary embodiments of the present disclosure, a base station can provide multiple wireless devices with frame structures that can accommodate the concept of time-slotted communications, closed-loop control cycle mechanism, and conception of cooperative-isochronous real-time operations between the multiple wireless devices. In addition, according to the present disclosure, the base station may provide the terminal with period information on a command period, action period, and report period. Further, according to the present disclosure, the base station may provide period information on a downlink period, guard section, and uplink period within of the action period. Accordingly, a terminal (i.e., wireless device) may receive downlink control data from the base station in the downlink period while performing actions in the action period. Furthermore, according to the present disclosure, the terminal may transmit uplink control data to the base station in the uplink period of the action period. As such, according to the present disclosure, the base station and the terminal may transmit and receive data in the action period, thereby maximizing resource efficiency.

DETAILED DESCRIPTION OF THE EMBODIMENTS

Figure 1:
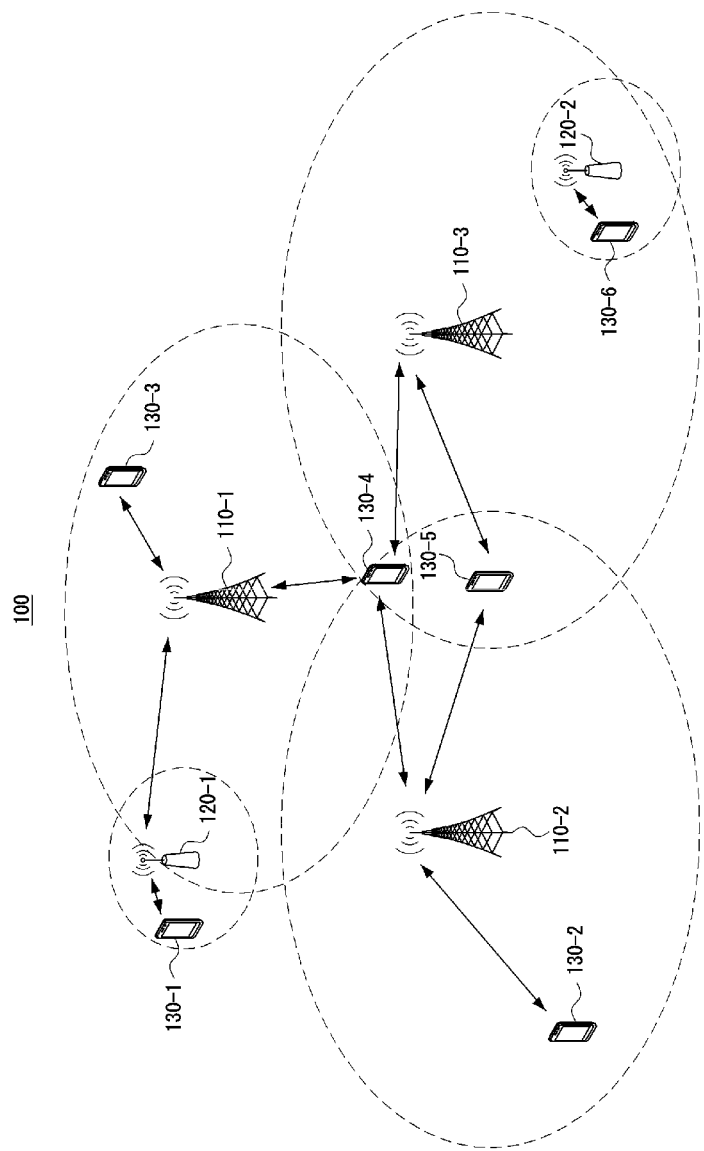
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
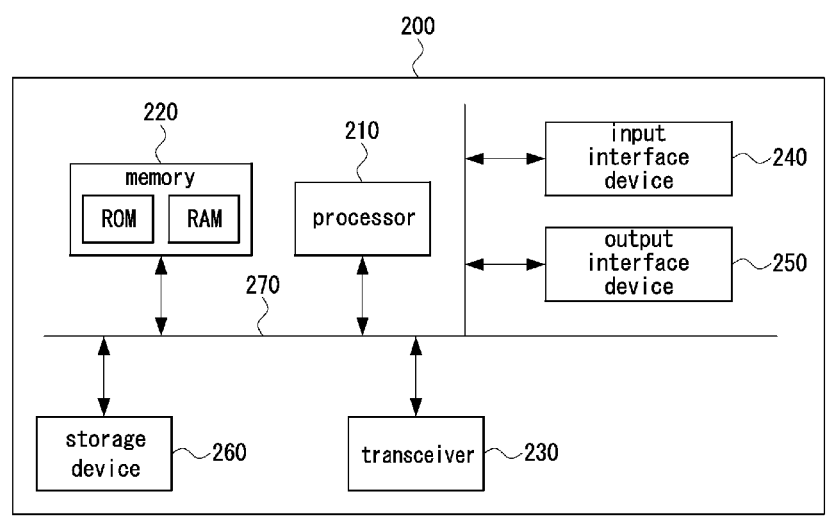
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Mobile robots are gaining prominence in manufacturing plants because of their advantages in terms of demands for human safety and high efficiency. Advances in technology allow manufacturers to develop robots that fit their operational needs and make implementations for their applications. The mobile robots can reduce manpower in warehouses and logistics, and eliminate human errors. Fatigue and lack of judgment in performing specific tasks can cause fatal financial loss and bodily injury. According to research, the global mobile robot market size is expected to reach $39.5 billion by 2026. In addition, Industry 4.0 can play a decisive role in making such the predictions in the global mobile robot market. One of the key innovations in Industry 4.0 is wireless-based factory automation rather than the traditional wired-based factory automation. Such the wireless-based factory automation system may have the following four advantages.

First, wireless-based factory automation systems can improve flexibility in factory automation. In the wireless-based factory automation systems, on-board sensors and cameras can be utilized in mobile robots to increase the agility and flexibility in operations of the mobile robots. Accordingly, the mobile robots may not follow predetermined paths. Also, the mobile robots can avoid obstacles and move from a specific point to a destination. In addition, the mobile robots can determine efficient paths by themselves. Such the flexibility allows the mobile robots to switch from one task to another task in a short amount of time. In this manner, the mobile robots can find the shortest path, thereby reducing a time taken to arrive at a destination. Accordingly, warehouses and large manufacturing plants can benefit from the increased flexibility of such the wireless-based factory automation system.

Second, wireless-based factory automation systems can increase safety in factory automation. The mobile robots may be equipped with various types of sensors and cameras. The various types of sensors and cameras can make it possible for the mobile robots to operate safely. Accordingly, the mobile robots can interpret the environment. Also, the mobile robots can understand other scenarios. In addition, the mobile robots can find paths and avoid obstacles. In contrast, when a person works using a forklift, there may be a possibility that a safety device is not built into the forklift, so that the person may feel fatigued or distracted while working. However, these problems can be eliminated using the mobile robots. The mobile robots can eliminate the possibility of human errors while improving overall manufacturing plant safety. The safety mechanisms can be provided to the mobile robots during programming stages, and can be used to ensure that tasks are performed in consideration of safety.

Third, wireless-based factory automation systems can improve scalability in factory automation. The mobile robots can be programmed to pick up objects and drop them at their destination, allowing more items to be reprogrammed. The mobile robots may also be capable of implementing modular deployment systems. This allows manufacturers to avoid high initial investment costs as manufacturers can purchase mobile robots as their needs grow, instead of investing a huge initial cost. This high initial investment can be avoided, allowing manufacturers to use those costs for other initiatives or departments. Also, after analyzing the business impact of mobile robots, manufacturers can decide whether to deploy them further.

Fourth, wireless-based factory automation systems can improve the ease of movement between facilities in factory automation. Many manufacturers may not opt for wired automation as they will have to move to new facilities if needed. If many manufacturers need to purchase an automation system and convert it to new facilities within the next three years, the entire system may have to be dismantled and moved. As a result, wired automation systems can be costly and time-consuming to dismantle, assemble, and move to another location. However, mobile robots may be easy to move and may not require much effort to move from one place to another. Mobile robots can move from place to place relatively easily compared to other systems. Mobile robots can be an ideal deployment option, even with the required automation for a short period of time. Mobile robots can also be deployed as a temporary solution when temporary operations are required. Depending on operating specifications, mobile robots can be ready and put to work in a matter of weeks.

Meanwhile, in industrial automation, a factory automation system may be one of the difficult use cases of the URLLC, which requires mission-critical communications having stringent reliability and latency requirements. In addition, the factory automation system may often involve real-time interaction between multiple wireless devices, and may require technologies for ultra-precise absolute time synchronization (ATS) between the wireless devices based on a common time reference.

Figure 3:
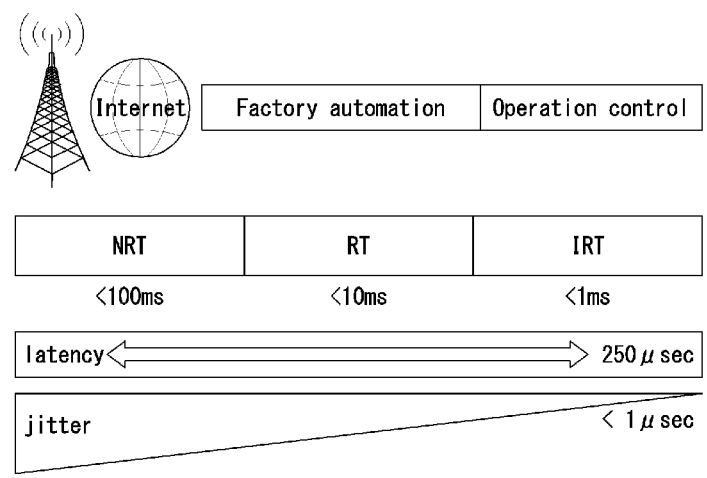
FIG. 3 is a conceptual diagram for describing performance requirements of a factory automation system.

FIG. 3 is a conceptual diagram for describing performance requirements of a factory automation system.

Referring to FIG. 3, when classifying factory automation systems based on applications regarding timeliness, determinism, and reliability requirements, there may be three main application classes such as i) non-real-time (NRT) or soft real-time application, ii) real-time (RT) application, and iii) isochronous real-time (IRT) application.

Here, the NRT application class may have a cycle time of less than 100 ms. Also, the RT application class may have a cycle time of less than 10 ms. Also, the IRT application may have a cycle time of less than 1 ms. On the other hand, most applications in the field of process automation may belong to the NRT or soft real-time application class. On the other hand, manufacturing applications that rely on robots and belt conveyors for assembly, picking, welding, and painting can perform operations sequentially in a timely manner. These tasks may require tightly synchronized real-time collaboration between multiple robots and production lines.

These manufacturing applications may be categorized as either RT or IRT application class. This means that manufacturing applications may need to meet the constraints of within a certain level of jitter (i.e., ATS error) as they should strictly adhere to a given deadline. In this regard, the Institute of Electrical and Electronics Engineers (IEEE) 802.1 time-sensitive networking (TSN) standards specify stringent performance requirements (e.g., 1 ms cycle time, 99.999% reliability, and ±0.5 s jitter). Innovative solutions may need to be presented in addition to the current 5G URLLC solution to meet the determinism of completing tasks within a given time and the isochronousness of completing tasks within a fixed ATS error.

On the other hand, in factory automation applications, wireless devices may belong to different base stations (BSs) or even different domains if industrial networks coexist. In order for wireless devices to achieve ATS between the wireless devices, an ATS mechanism may be required that goes beyond timing-based frame alignment between the wireless devices and the base station. On the other hand, an ATS procedure for the existing LTE-TDD and radio coordination in a small cell are limited only to synchronization between base stations. In order for the factory automation system to enable time synchronization between wireless devices, it may be required to standardize an additional physical layer frame structure and numerologies therefor in the 5G URLLC specifications.

On the other hand, closed-loop control applications (i.e., robot manufacturing, round table production, machine tools, packaging and printing) in the factory automation systems may be the main targets of the URLLC. In these applications, the ultra-precise ATS may require consideration of real-time and time-delayed communication and isochronous task executions as presented below.

First, factory automation systems may require closed-loop control cycle communications. A typical closed-loop control cycle may include a series of a downlink command transaction to a wireless device, activation of the wireless device, and an uplink report from the wireless device to the base station.

Figure 4:
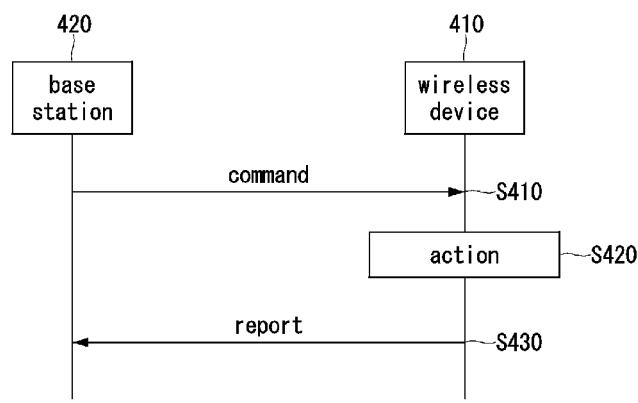
FIG. 4 is a sequence chart illustrating a first exemplary embodiment of a closed-loop control method in a factory automation system.

FIG. 4 is a sequence chart illustrating a first exemplary embodiment of a closed-loop control method in a factory automation system.

Referring to FIG. 4, in a closed-loop control method, a base station (BS) may control at least one wireless device through wireless communications. More specifically, a factory automation system may include a wireless device 410 and a base station 420 for controlling the wireless device 410. The base station 420 may be connected to the wireless device 410 through wireless communications to control operations of the wireless device 410.

There may be one or a plurality of wireless devices in the factory automation system. There may be one or a plurality of base stations in the factory automation system. The at least one device 410 may include, for example, a sensor, an actuator, or a device for implementing factory automation of a robot. The factory automation system may control automated production processes through the base station 420.

For example, the factory automation system may control various automated processes such as a manufacturing process by robots, a production process by conveyor belts, or a packaging process of produced products through the base station 420. When a wireless control scheme is applied to the factory automation system, if the reliability of the control is excessively decreased or the delay time is excessively increased compared to the conventional wired control scheme, the precision of the production processes and the quality of the products may be deteriorated. Alternatively, if the reliability of the factory automation system decreases and/or the delay time increases excessively, the production lines may be damaged or there may occur problems in the safety of the working environment.

Therefore, in case of a factory automation system to which the wireless control scheme is applied, the URLLC conditions may be required for the precision of the production processes. Alternatively, the URLLC conditions may be required in a wireless control system applied to various fields such as collaborative robot surgery, telemedicine surgery, automatic distributed control of smart grid, traffic system control, or cooperative driving/flight control between a plurality of moving objects. Such the factory automation system may be configured based on a closed-loop control cycle scheme. The closed-loop control cycle may consist of control events such as a command, an action, and a report.

Figure 5:
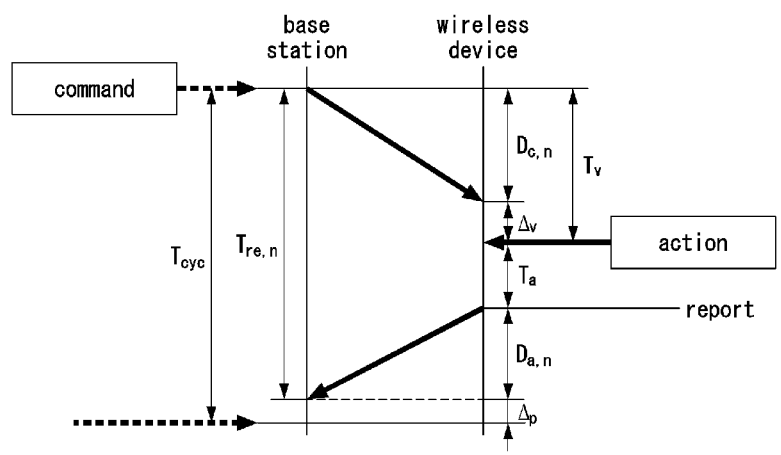
FIG. 5 is a conceptual diagram illustrating a first exemplary embodiment of a closed-loop control cycle in a factory automation system.

FIG. 5 is a conceptual diagram illustrating a first exemplary embodiment of a closed-loop control cycle in a factory automation system.

Referring to FIG. 5, in a closed-loop control cycle, a cycle time $T_{cyc}$ may be composed of a response time $T_{re,n}$ and a processing time $\Delta p$ of the base station. Here, n may be an index of a wireless device (i.e., terminal). In addition, the response time may be composed of a command time $T_v$, an action time $T_a$, and a report time $D_{a,n}$. Here, the command time may be composed of a transmission delay time $D_{c,n}$ and a margin time $\Delta_v$.

Referring again to FIG. 4, the wireless device 410 may perform an action based on a command of the base station 420, and report a result thereof to the base station 420. Specifically, the base station 420 may transmit a command signal indicating an action of the wireless device 410 to the wireless device 410 (S410). The wireless device 410 may receive the command signal from the base station 420. The wireless device 410 may execute the action indicated by the received command signal (S420).

The wireless device 410 may transmit a report signal including information on the contents or result of the performed action to the base station 420 (S430). Transmission of a signal from the base station 420 to the wireless device 410 may be referred to as 'forward transmission' or 'downlink transmission'. On the other hand, transmission of a signal from the wireless device 410 to the base station 420 may be referred to as 'reverse transmission'. Alternatively, transmission of a signal from the wireless device 410 to the base station 420 may be referred to as 'uplink transmission'. Such the control events of the command, action, and report according to the steps S410 to S430 may all be performed within a preset cycle time.

The control events may occur isochronously. The cycle time may be a time from a time at which the base station 420 transmits the command to a time at which the base station 420 receives the response from the wireless device 410. The TSN technical specifications may specify strict end-to-end latency and reliability constraints for each transaction. That is, the TSN technical specifications may specify to complete the command, action, and report within a 1 ms cycle time with a reliability of 99.999%. In addition, the TSN technical specifications may specify a constraint of requiring an ATS error of ±0.5 between devices.

Second, factory automation systems may need multi-robot cooperative-isochronous real-time operations. Multiple mobile robots may collaborate in motion control applications (i.e., mobilizing multiple tractors, symmetric welding and polishing on automotive production lines) to perform precisely sequential or isochronous movements. An important requirement for these mobile robots for cooperative operations may be execution of synchronized tasks.

Accurate ATS may be required across the devices and controllers, so that the mobile robots are cooperating with each other to perform synchronized tasks. Therefore, when the controller transmits commands to the robots (i.e., wireless devices) to operate isochronously at a specific time or sequentially at set times, the robot may operate and respond within an absolute time error of less than ±0.5 μs. The latency in the operations may cause a damage or inefficient production.

Third, factory automation systems may require time-slotted communications. In order for the base station or wireless device to transmit packets with a finite delay in real-time traffic, time-divisioned communication in units of slots may be an effective mechanism. The existing industrial wired/wireless network may be a variant of such the time-slotted communication. Factory automation systems may require perfect ATS, as any timing errors may cause overlapping of time intervals between wireless devices, impairing communication reliability. In monitoring applications, time information may be embedded in sensing data for operations such as data fusion. Thus, collaborative sensors may be synchronized.

Accordingly, the present disclosure provides physical layer frames structure essential for performing the multi-robot cooperative-isochronous real-time operations while accommodating a time-slot-based closed-loop control cycle mechanism in a mission-critical industrial wireless system including industrial applications of factory automation, numerologies for the frame structure, and operational procedures according to such the structures.

The physical layer frame structures proposed in the present disclosure satisfy factory automation that requires acceptance of the time-slotted communication concept, the closed-loop control cycle mechanism, and the cooperative-isochronous real-time operation concept of multiple wireless devices (hereinafter, a wireless device is referred to as a terminal). To this end, in the physical layer frame structures proposed in the present disclosure, the downlink communication (from the base station to the terminal) and the uplink communication (from the terminal to the base station) may be performed using the same frequency band, but they may be based on a time division duplex (TDD) scheme of dividing the uplink and the downlink in the time domain.

Figure 6:
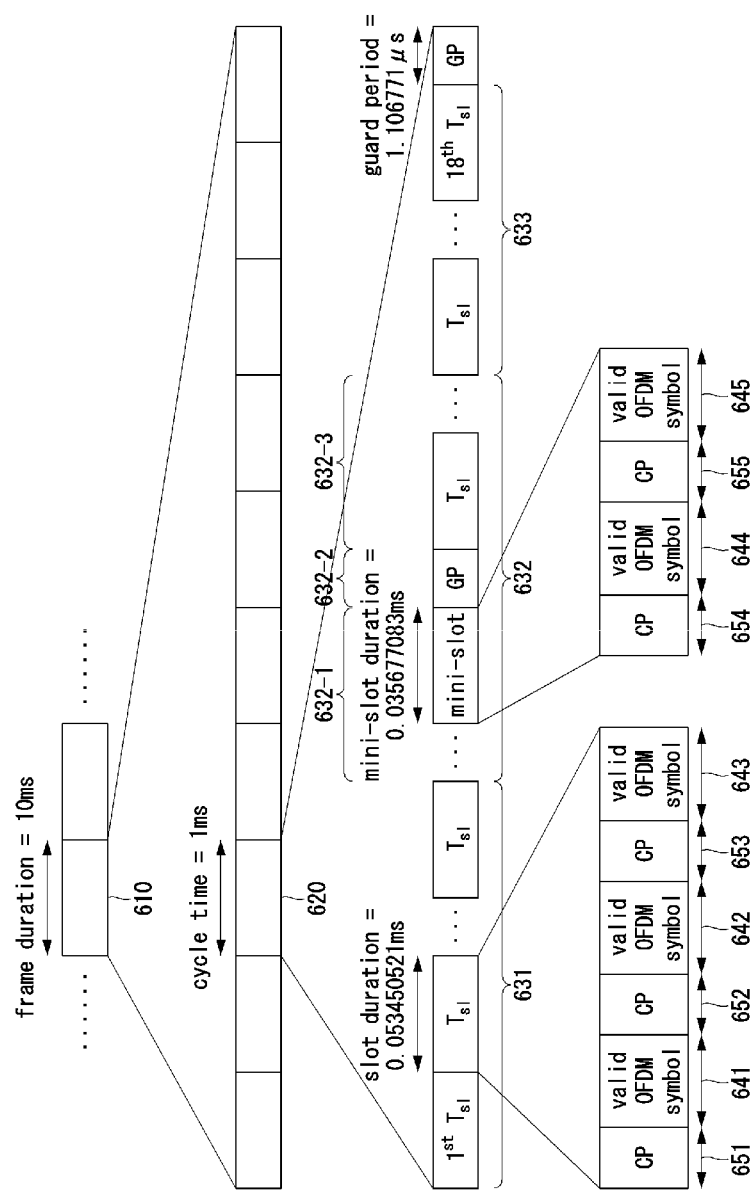
FIG. 6 is a conceptual diagram illustrating a first exemplary embodiment of a structure of a frame in a factory automation system.

FIG. 6 is a conceptual diagram illustrating a first exemplary embodiment of a structure of a frame in a factory automation system.

Referring to FIG. 6, a frame duration of a frame 610 may be, for example, 10 ms. Also, one frame 610 may be composed of, for example, ten sub-frames 620. Each sub-frame may have, for example, a duration of 1 ms. For example, the sub-frame duration may be the same as a cycle time of a closed-loop control cycle of the factory automation system. Accordingly, one cycle time may be configured as 1 ms, for example.

In addition, the sub-frame 620 may include, for example, 18 slots and 2 guard periods (GPs). Here, among the 18 slots, 17 slots may be first type slots, and one slot may be a second type slot. Here, the first type slot may be expressed as $T_{sl}$, and the second type slot may be expressed as a mini-slot. A slot duration (i.e., slot length) of the first type slot may be, for example, 0.053450521 ms. In addition, a slot duration (i.e., slot length) of the second type slot may be, for example, 0.035677083 ms. Also, the guard period may have, for example, a duration of 1.106771 μs.

Such the frame 610 may occur periodically. The base station and the terminal may repeat a process of transmitting and receiving data through the slots constituting the sub-frame 620. The sub-frame duration of the sub-frame 620 may correspond to a cycle time. Here, as an example, the sub-frame duration and the cycle time are made to coincide with each other, but exemplary embodiments of the present disclosure may not be limited thereto. An exemplary embodiment of having a plurality of cycle times within one frame also may be included in the scope of the present disclosure.

In order to reflect the closed-loop control cycle mechanism, the sub-frame may be divided into a command period 631, an action period 632, and a report period 633. For example, n consecutive first type slots among 18 slots may form the command period 631. For example, among 18 slots, m+1 consecutive slots including m first type slots and one second type slot, and one GP may form the action period 632. For example, k consecutive first type slots among 18 slots may form the report period 633. Here, n, m, and k may be natural numbers.

Here, a downlink period 632-1 of the action period 632 may be located before a GP 632-2, and the base station may transmit downlink control data to the terminal in the downlink period 632-1. In addition, an uplink period 632-3 of the action period 632 may be located after the GP 632-2, and the terminal may transmit uplink control data to the base station in the uplink period 632-3. In addition, in the action period 632, the second type slot (i.e., mini-slot) may be located before the GP 632-2. As such, in the action period 632 of the sub-frame 620, a transmission direction may be switched based on the guard period 632-2. That is, in the action period 632, the transmission direction may be, for example, downlink in the downlink period 632-1 before the GP 632-2, and uplink in the uplink period 632-3 after the GP 632-2. Accordingly, the GP 632-2 may be a transmission direction switching period.

On the other hand, three valid symbol periods 641, 642, and 643 in which valid OFDM symbols are transmitted may exist sequentially within one first type slot. A first guard interval (GI) 651 into which a cyclic prefix (CP) is inserted may be located before the first valid symbol period 641. In addition, a second GI 652 into which a CP is inserted may exist between the first valid symbol period 641 and the second valid symbol period 642, and a third GI 653 into which a CP is inserted may exist between the second valid symbol period 642 and the third valid symbol period 643. Two valid symbol periods 644 and 645 in which valid OFDM symbols are transmitted may exist sequentially within one second type slot. A first GI 654 into which a CP is inserted may exist before the first valid symbol period 644. In addition, a second GI 655 into which a CP is inserted may exist between the first valid symbol period 644 and the second valid symbol period 645.

According to such the configuration, the base station may transmit a command signal including a command for an action of the terminal to the terminal through downlink in the command period 631. Accordingly, the terminal may perform an action according to the command of the command signal received from the base station in the action period 632. Finally, the terminal may transmit a report signal including a report on a result of the action to the base station through uplink in the report period 633. The base station and the terminal periodically repeat the above procedure at every cycle time, thereby realizing the closed-loop control cycle mechanism.

Meanwhile, symbols of a plurality of slots located in the command period 631 may include information data and a reference signal (RS) for channel estimation for demodulation of the information data, channel quality estimation, and synchronization correction. The information data in the plurality of slots located in the command period 631 may be a command(s) mainly transmitted by the base station to the terminal(s).

Further, a plurality of slots located before the GP 632-2 of the action period 632 may include at least one of system control information (e.g., bandwidth information, the number of transmission antennas, downlink physical channel resource scheduling information, uplink physical channel resource scheduling information, time information for absolute synchronization, frame duration information, cycle time information, or application identifier (ID)), cell search information, physical layer signal, or information for random access. The base station may transmit, to the terminals through downlink, at least one of the system control information, cell search information, physical layer signal, or information for random access by using a plurality of slots located in the downlink period 632-1 before the GP 632-2 of the action period 632. Then, the terminal may receive from the base station at least one of the system control information, cell search information, physical layer signal, or information for random access.

A plurality of slots located in the uplink period 632-3 after the GP 632-2 of the action period 632 may include at least one of system control information, random access information (e.g., random access preamble), physical layer signal, or other uplink control information. The terminal may transmit at least one of the system control information, random access information, physical layer signal, or other uplink control information to the base station through uplink in the plurality slots of the uplink period 632-3 located after the GP 632-2 of the action period 632. Then, the base station may receive at least one of the system control information, random access information, physical layer signal, or other uplink control information from the terminal.

In parallel with the above operation, the terminal may perform sequential or isochronous operations at a predetermined time according to the command obtained from the base station in the command period 631 to accommodate the concept of cooperative-isochronous real-time operations of multiple terminals in the action period 632. Here, the position of the second type slot (i.e., mini-slot) may be located at the beginning or the middle of the action time of the action period 632.

Here, if the terminal having received the command from the base station in the command period 631 performs only the action at the predetermined time in the action period 632, frequency and time resources may be wasted. Accordingly, the terminal may maximize resource efficiency by performing the action in the action period 632 and simultaneously using these resources to transmit and receive signals including the above-described information. In addition, the terminal may not know what application mode the serving cell provides at the time of initial system access.

Accordingly, in the action period 632, the base station may broadcast system control information indicating the application mode. Then, in the action period 632, the terminal may receive the system information indicating the application mode from the base station, and identify the application mode. Also, in the action period 632, the base station may transmit a physical layer signal(s) for providing downlink time/frequency synchronization and a cell ID to the terminal.

Then, the terminal may receive the physical layer signal for providing downlink time/frequency synchronization and the cell ID from the base station. In addition, in the action period 632, the base station may transmit broadcast information for connecting the terminal to a system of the serving cell to the terminal on a physical broadcast channel (BCH). Then, the terminal may receive the broadcast information for connecting to the system of the serving cell from the base station. In addition, in the action period 632, the base station may transmit a physical layer signal for providing uplink time synchronization to the terminal. Then, the terminal may receive the physical layer signal for providing uplink time synchronization from the base station. In addition, in the action period 632, the base station may transmit random access information for accessing the system of the serving cell to the terminal by loading it on a physical channel. Then, the terminal may receive the random access information for accessing the system of the serving cell from the base station.

In particular, the base station may transmit, to the terminal, a broadcast channel including at least one of a physical layer synchronization signal for acquisition of time/frequency synchronization, a physical layer synchronization signal for acquisition of a physical cell ID, information on a bandwidth for system access, the number of transmission antennas, and a system frame number (SFN), by using the mini-slot located in the downlink period 632-1 of the action period 632.

of time and frequency synchronization may be further improved by using the physical layer signals received at every cycle time.

The symbol(s) within one slot of the report period 633 may include data and a reference signal (RS) for channel estimation for demodulation of the data, channel quality estimation, and synchronization correction. The data of the multiple slots of the report period 633 may be data which the terminal reports as a result response of the action according to the command received from the base station.

Table 1 shows physical layer numerologies over the frequency domain and the time domain of the frame of FIG. 6 when an OFDM scheme is applied. Here, the numerologies are determined as an example for the frame of FIG. 6 as shown in Table 1, but may not be limited thereto. Cases having different inter-site distance (ISD), bandwidth (BW), carrier frequency $f_c$, cyclic prefix (CP), inverse fast Fourier transform (IFFT) size N, GP, and sub-carrier spacing (SCS) $\Delta_f$ in the same or similar form may be included in the scope of the present disclosure.

As shown in Table 1, a bandwidth occupied by the synchronization signal may be smaller than a bandwidth occupied by the data and control signals, or may be substantially the same as or equal to the bandwidth occupied by the data and control signals.

TABLE 1

| Numerology | Parameter |
|---|---|
| Carrier frequency $f_c$ | 3.5 GHz |
| ISD | 200 m |
| SCS $\Delta_f$ | 60 kHz |
| IFFT size N | 512 |
| BW | 97.8 MHz (data and control) |
| | 8.64 MHz (synchronization) |
| CP length of OFDM symbol | 34 samples (slot) |
| | 36 samples (mini-slot) |
| CP interval of OFDM symbol $T_{cp}$ | 1.106771 μs (slot), |
| | 1.171875 μs (mini-slot) |
| Sample duration $t_s = T_s/N$ | 0.032552 μs |
| Sampling rate $N\Delta_f$ | 30.72 MHz |
| Valid OFDM symbol length $T_s = 1/\Delta_f$ | 16.67 μs (corresponding 512 samples) |
| OFDM symbol length $T_{cp} + T_s$ | 17.773438 μs (slot, corresponding to 546 samples) |
| | 17.838542 μs (mini-slot, corresponding to 548 samples) |
| Slot duration $T_{sl}$ | 53.450521 μs (corresponding to 1642 samples) |
| Mini-slot duration $T_{msl}$ | 35.677083 μs (corresponding to 1096 samples) |
| GP $T_{gp}$ | 1.106771 μs (corresponding to 34 samples) |
| Cycle time $18T_{sl} + T_{msl} + 2T_{gp}$ | 1 ms (corresponding to 30720 samples) |

Then, the terminal may receive, from the base station, the broadcast channel including at least one of the physical layer synchronization signal for acquisition of time/frequency synchronization, physical layer synchronization signal for acquisition of a physical cell ID, information on a bandwidth for system access, the number of transmission antennas, and an SFN, through the mini-slot located in the downlink period 632-1 of the action period 632.

On the other hand, in order to overcome poor characteristics of a radio fading channel, unlike the conventional 4G and 5G mobile communication systems that transmit the above-described physical channels and physical layer signals only at the beginning or middle of a frame, the base station according to the present disclosure may transmit the above-described physical channels and physical layer signals at every cycle time. Then, the terminal may receive the above-described physical channels and physical layer signals from the base station at every cycle time. The accuracy FIG. 7 is a conceptual diagram illustrating a second exemplary embodiment of the structure of a frame in a factory automation system.

Figure 7:
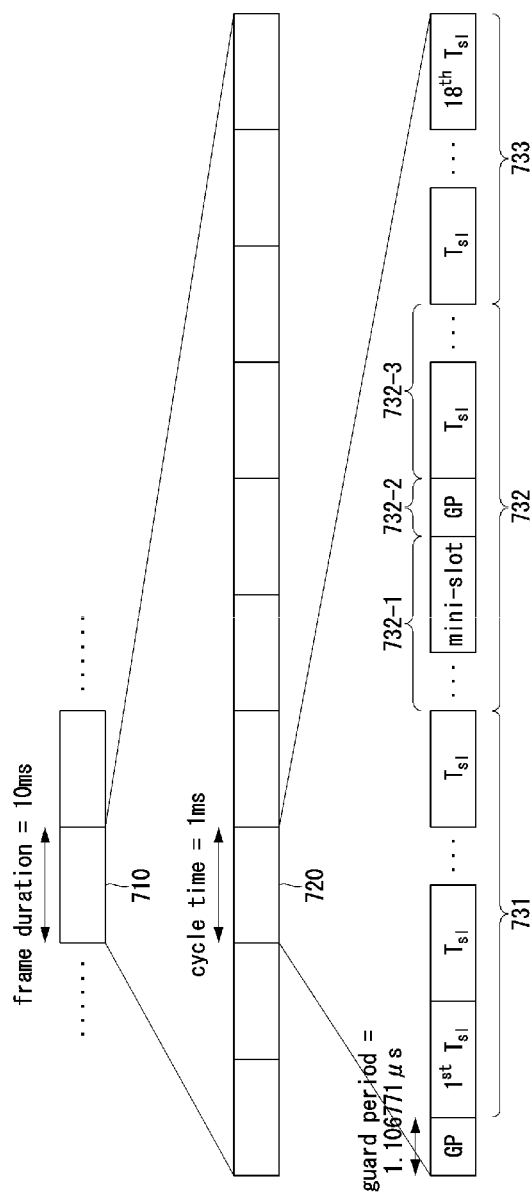
FIG. 7 is a conceptual diagram illustrating a second exemplary embodiment of the structure of a frame in a factory automation system.

Referring to FIG. 7, a frame duration of a frame 710 may be, for example, 10 ms. Also, one frame 710 may be composed of, for example, ten sub-frames 720. Each sub-frame may have, for example, a duration of 1 ms. For example, the sub-frame duration may be the same as a cycle time of a closed-loop control cycle of the factory automation system. Accordingly, one cycle time may be configured as 1 ms, for example.

In addition, the sub-frame 720 may include, for example, 18 slots and 2 GPs. Here, among the 18 slots, 17 slots may be first type slots, and one slot may be a second type slot. Here, the first type slot may be expressed as $T_{sl}$, and the second type slot may be expressed as a mini-slot. A slot duration (i.e., slot length) of the first type slot may be, for example, 0.053450521 ms. In addition, a slot duration (i.e., slot length) of the second type slot may be, for example, 0.035677083 ms. Also, the GP may have, for example, a duration of 1.106771 μs.

Such the frame 710 may occur periodically. The base station and the terminal may repeat a process of transmitting and receiving data through the slots constituting the sub-frame 720. The sub-frame duration of the sub-frame 720 may correspond to a cycle time. Here, as an example, the sub-frame duration and the cycle time are made to coincide with each other, but exemplary embodiments of the present disclosure may not be limited thereto. An exemplary embodiment of having a plurality of cycle times within one frame also may be included in the scope of the present disclosure.

In order to reflect the closed-loop control cycle mechanism, the sub-frame may be divided into a command period 731, an action period 732, and a report period 733. For example, n consecutive first type slots among 18 slots may form the command period 731. For example, among 18 slots, m+1 consecutive slots including m first type slots and one second type slot, and one GP may form the action period 732. For example, k consecutive first type slots among 18 slots may form the report period 733. Here, n, m, and k may be natural numbers.

Here, a downlink period 732-1 of the action period 732 may be located before a GP 732-2, and the base station may transmit downlink control data to the terminal in the downlink period 732-1. In addition, an uplink period 732-3 of the action period 732 may be located after the GP 732-2, and the terminal may transmit uplink control data to the base station in the uplink period 732-3. In addition, in the action period 732, the second type slot (i.e., mini-slot) may be located before the GP 732-2. As such, in the action period 732 of the sub-frame 720, a transmission direction may be switched based on the GP 732-2.

On the other hand, three valid symbol periods in which valid OFDM symbols are transmitted may exist sequentially within one first type slot. A first GI into which a CP is inserted may be located before the first valid symbol period. In addition, a second GI into which a CP is inserted may exist between the first valid symbol period and the second valid symbol period, and a third GI into which a CP is inserted may exist between the second valid symbol period and the third valid symbol period.

Two valid symbol periods in which valid OFDM symbols are transmitted may exist sequentially within one second type slot. A first GI into which a CP is inserted may exist before the first valid symbol period. In addition, a second GI into which a CP is inserted may exist between the first valid symbol period and the second valid symbol period. As described above, the frame structure according to the second exemplary embodiment of FIG. 7 may be substantially similar to the frame structure according to the first exemplary embodiment of FIG. 6. However, the frame structure of FIG. 7, in which the GP is located at the start region of the sub-frame 720, may be different from the frame structure of FIG. 6, in which the GP is at the end region of the sub-frame 620. That is, the frame structure and numerologies of the exemplary embodiment of FIG. 7 may be identical to those of the exemplary embodiment of FIG. 6 except the position of the GP (i.e., at the beginning of the cycle time or at the end of the cycle time).

In the above configuration, operations performed by the base station and the terminal in the command period 731, action period 732, and report period 733 may be substantially similar to the contents disclosed in FIG. 6. In addition, the physical layer numerologies over the frequency domain and the time domain of the frame of FIG. 7 may be as shown in Table 1.

Meanwhile, in the exemplary embodiments of FIGS. 6 and 7, as an example, one slot may be configured to include three OFDM symbols. However, in mission-critical applications, reliability of transmission/reception data delivery is important, but it may also be very important to reduce latency for transmission/reception data delivery so that sequential or isochronous operations should be performed relatively quickly at a predetermined time. Accordingly, in order to further reduce latency, the mini-slot may be eliminated and all slots may be configured to include two OFDM symbols as shown in FIG. 8.

Figure 8:
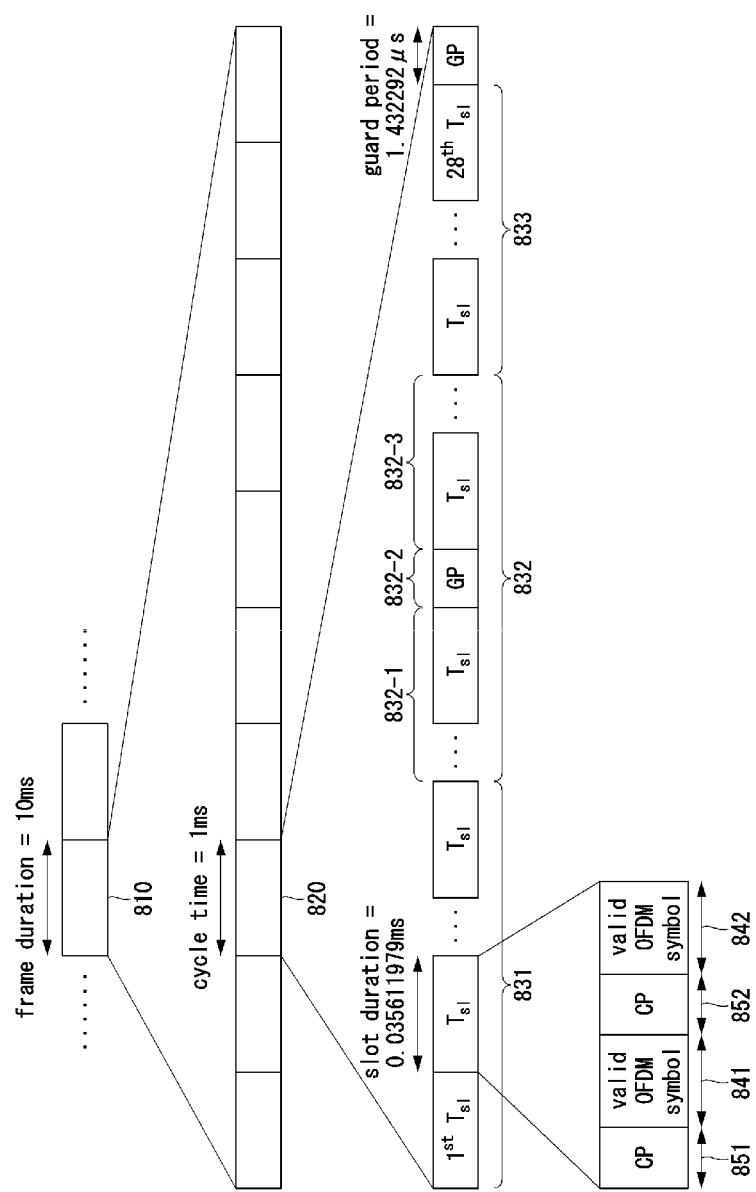
FIG. 8 is a conceptual diagram illustrating a third exemplary embodiment of the structure of a frame in a factory automation system.

FIG. 8 is a conceptual diagram illustrating a third exemplary embodiment of the structure of a frame in a factory automation system.

Referring to FIG. 8, a frame duration of a frame 810 may be, for example, 10 ms. Also, one frame 810 may be composed of, for example, ten sub-frames 820. Each sub-frame may have, for example, a duration of 1 ms. For example, the sub-frame duration may be the same as a cycle time of a closed-loop control cycle of the factory automation system. Accordingly, one cycle time may be configured as 1 ms, for example. In addition, the sub-frame 820 may include, for example, 28 slots and 2 GPs. Here, each of the 28 slots may be expressed as $T_{sl}$. A slot duration (i.e., slot length) of each of the 28 slots may be, for example, 0.035611979 ms. In addition, the GP may have a duration of 1.432292 μs.

Such the frame 810 may occur periodically. The base station and the terminal may repeat a process of transmitting and receiving data through the slots constituting the sub-frame 820. The sub-frame duration of the sub-frame 820 may correspond to a cycle time. Here, as an example, the sub-frame duration and the cycle time are made to coincide with each other, but exemplary embodiments of the present disclosure may not be limited thereto. An exemplary embodiment of having a plurality of cycle times within one frame also may be included in the scope of the present disclosure.

In order to reflect the closed-loop control cycle mechanism, the sub-frame may be divided into a command period 831, an action period 832, and a report period 833. For example, n consecutive slots among the 28 slots may form the command period 831. For example, among 18 slots, m consecutive slots among the 28 slots, and one guard period may form the action period 832. For example, k consecutive slots among the 28 slots may form the report period 833. Here, n, m, and k may be natural numbers.

Here, a downlink period 832-1 of the action period 832 may be located before a GP 832-2, and the base station may transmit downlink control data to the terminal in the downlink period 832-1. In addition, an uplink period 832-3 of the action period 832 may be located after the GP 832-2, and the terminal may transmit uplink control data to the base station in the uplink period 832-3. As such, in the action period 832 of the sub-frame 820, a transmission direction may be switched based on the GP 832-2. That is, in the action period 832, a transmission direction may be, for example, downlink in the downlink period 832-1 before the GP 832-2, and uplink in the uplink period 832-3 after the GP 832-2.

Two valid symbol periods 841 and 842 in which valid OFDM symbols are transmitted may exist sequentially within one slot. A first GI 851 into which a CP is inserted may be located before the first valid symbol period 841. In addition, a second GI 852 into which a CP is inserted may exist between the first valid symbol period 841 and the second valid symbol period 842.

According to such the configuration, the base station may transmit a command signal including a command for an action of the terminal to the terminal through downlink in the command period 831. Accordingly, the terminal may perform an action according to the command of the command signal received from the base station in the action period 832. Finally, the terminal may transmit a report signal including a report on a result of the action to the base station through uplink in the report period 833. The base station and the terminal periodically repeat the above procedure at every cycle time, thereby realizing the closed-loop control cycle mechanism.

Symbols of a plurality of slots located in the command period 831 may include information data and an RS for channel estimation for demodulation of the information data, channel quality estimation, and synchronization correction. The information data in the plurality of slots located in the command period 831 may be a command(s) mainly transmitted by the base station to the terminal(s).

Further, a plurality of slots located before the GP 832-2 of the action period 832 may include at least one of system control information (e.g., bandwidth information, the number of transmission antennas, downlink physical channel resource scheduling information, uplink physical channel resource scheduling information, time information for absolute synchronization, frame duration information, cycle time information, or application ID), cell search information, physical layer signal, or information for random access. The base station may transmit, to the terminals through downlink, at least one of the system control information, cell search information, physical layer signal, or information for random access by using a plurality of slots located in the downlink period 832-1 before the GP 832-2 of the action period 832. Then, the terminal may receive from the base station at least one of the system control information, cell search information, physical layer signal, or information for random access.

A plurality of slots located in the uplink period 832-3 after the GP 832-2 of the action period 832 may include at least one of system control information, random access information (e.g., random access preamble), physical layer signal, or other uplink control information. The terminal may transmit at least one of the system control information, random access information, physical layer signal, or other uplink control information to the base station through uplink in the plurality slots of the uplink period 832-3 located after the GP 832-2 of the action period 832. Then, the base station may receive at least one of the system control information, random access information, physical layer signal, or other uplink control information from the terminal.

In parallel with the above operation, the terminal may perform sequential or isochronous operations at a predetermined time according to the command obtained from the base station in the command period 831 to accommodate the concept of cooperative-isochronous real-time operations of multiple terminals in the action period 832.

In particular, the base station may transmit, to the terminal, a broadcast channel in the downlink period 832-1 of the action period 832. The broadcast channel may include at least one of a physical layer synchronization signal for acquisition of time/frequency synchronization, a physical layer synchronization signal for acquisition of a physical cell ID, information on a bandwidth for system access, the number of transmission antennas, and an SFN. Then, the terminal may receive, from the base station, the broadcast channel in the downlink period 832-1 of the action period 832.

Here, if the terminal having received the command from the base station in the command period 831 performs only the action at the predetermined time in the action period 832, frequency and time resources may be wasted. Accordingly, the terminal may maximize resource efficiency by performing the action in the action period 832 and simultaneously using these resources to transmit and receive signals including the above-described information. In addition, the terminal may not know what application mode the serving cell provides at the time of initial system access.

Accordingly, in the action period 832, the base station may broadcast system control information indicating the application mode. Then, in the action period 832, the terminal may receive the system information indicating the application mode from the base station, and identify the application mode. Also, in the action period 832, the base station may transmit a physical layer signal for providing downlink time/frequency synchronization and a cell ID to the terminal. Then, the terminal may receive the physical layer signal for providing downlink time/frequency synchronization and the cell ID from the base station.

In addition, in the action period 832, the base station may transmit broadcast information for connecting the terminal to a system of the serving cell to the terminal on a BCH. Then, the terminal may receive the broadcast information for connecting to the system of the serving cell from the base station. In addition, in the action period 832, the base station may transmit a physical layer signal for providing uplink time synchronization to the terminal.

Then, the terminal may receive the physical layer signal for providing uplink time synchronization from the base station. In addition, in the action period 832, the base station may transmit random access information for accessing the system of the serving cell to the terminal by loading it on a physical channel. Then, the terminal may receive the random access information for accessing the system of the serving cell from the base station.

In order to overcome poor characteristics of a radio fading channel, unlike the conventional 4G and 5G mobile communication systems that transmit the above-described physical channels and physical layer signals only at the beginning or middle of a frame, the base station according to the present disclosure may transmit the above-described physical channels and physical layer signals at every cycle time. Then, the terminal may receive the above-described physical channels and physical layer signals from the base station at every cycle time. The accuracy of time and frequency synchronization may be further improved by using the physical layer signals received at every cycle time.

The symbol(s) within one slot of the report period 833 may include data and an RS for channel estimation for demodulation of the data, channel quality estimation, and synchronization correction. The data of the multiple slots of the report period 833 may be data which the terminal reports as a result response of the action according to the command received from the base station.

Table 2 shows physical layer numerologies over the frequency domain and the time domain of the frame of FIG. 8 when an OFDM scheme is applied. Here, the numerologies are determined as an example for the frame of FIG. 8 as shown in Table 2, but may not be limited thereto. Cases having different inter-site distance (ISD), bandwidth (BW), carrier frequency $f_c$, cyclic prefix (CP), inverse fast Fourier transform (IFFT) size N, GP, and sub-carrier spacing (SCS) $\Delta_f$ in the same or similar form may be included in the scope of the present disclosure.

As shown in Table 2, a bandwidth occupied by the synchronization signal may be smaller than a bandwidth occupied by the data and control signals, or may be substantially the same as or equal to the bandwidth occupied by the data and control signals.

TABLE 2

| Numerology | Parameter |
| --- | --- |
| Carrier frequency $f_c$ | 3.5 GHz |
| ISD | 200 m |
| SCS $\Delta_f$ | 60 kHz |
| IFFT size N | 512 |
| BW | 97.8 MHz (data and control) |
|  | 8.64 MHz (synchronization) |
| CP length of OFDM symbol | 34 samples (slot) |
| CP interval of OFDM symbol $T_{cp}$ | 1.106771 μs (slot) |
| Sample duration $t_s = T_s/N$ | 0.032552 μs |
| Sampling rate $N\Delta_f$ | 30.72 MHz |
| Valid OFDM symbol length $T_s = 1/\Delta_f$ | 16.67 μs (corresponding 512 samples) |
| OFDM symbol length $T_{cp} + T_s$ | 17.773438 μs (slot, corresponding to 546 samples) |
| Slot duration $T_{sl}$ | 53.611979 μs (corresponding to 1094 samples) |
| GP $T_{gp}$ | 1.432292 μs (corresponding to 44 samples) |
| Cycle time $28T_{sl} + 2T_{gp}$ | 1 ms (corresponding to 30720 samples) |

Figure 9:
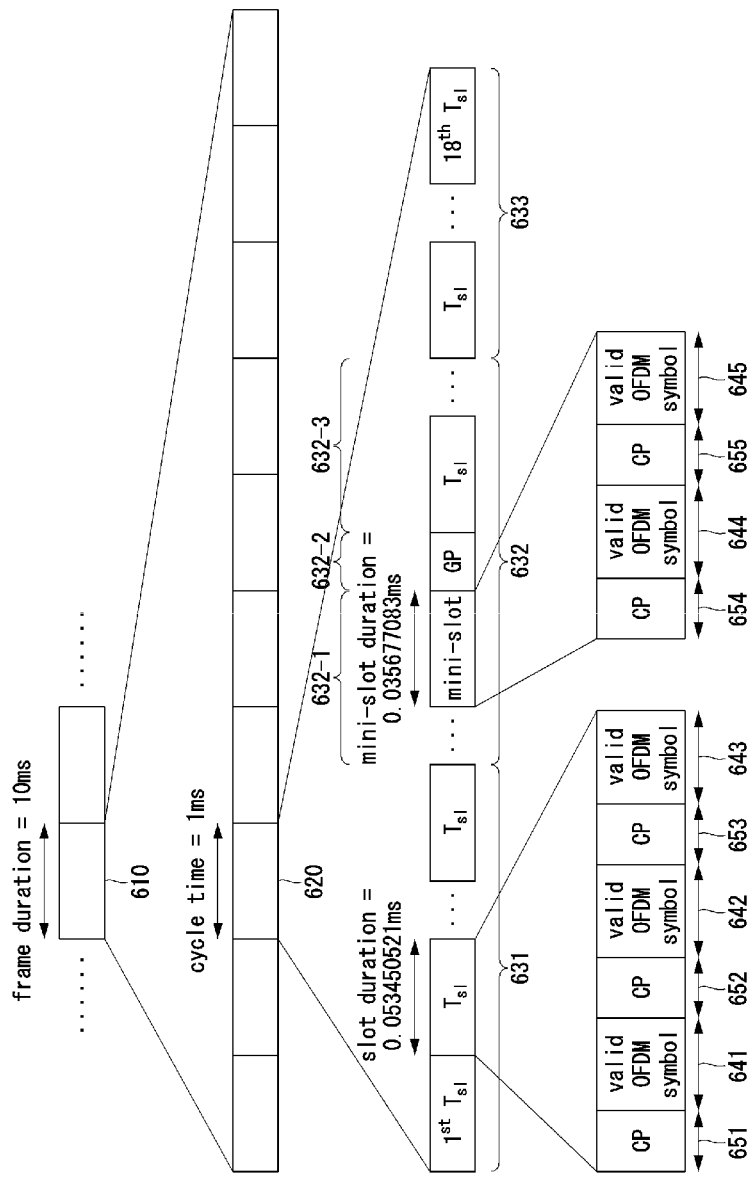
FIG. 9 is a conceptual diagram illustrating a fourth exemplary embodiment of the structure of a frame in a factory automation system.

FIG. 9 is a conceptual diagram illustrating a fourth exemplary embodiment of the structure of a frame in a factory automation system.

The frame structure of FIG. 9 may be similar to the frame structures of FIGS. 6 and 7. However, the frame structure of FIG. 9 may be a frame structure in which the GPs are removed from the frame structures of FIGS. 6 and 7. The rest of the description of the exemplary embodiment of FIG. 9 may be the same as the description of the exemplary embodiments of FIGS. 6 and 7.

Figure 10:
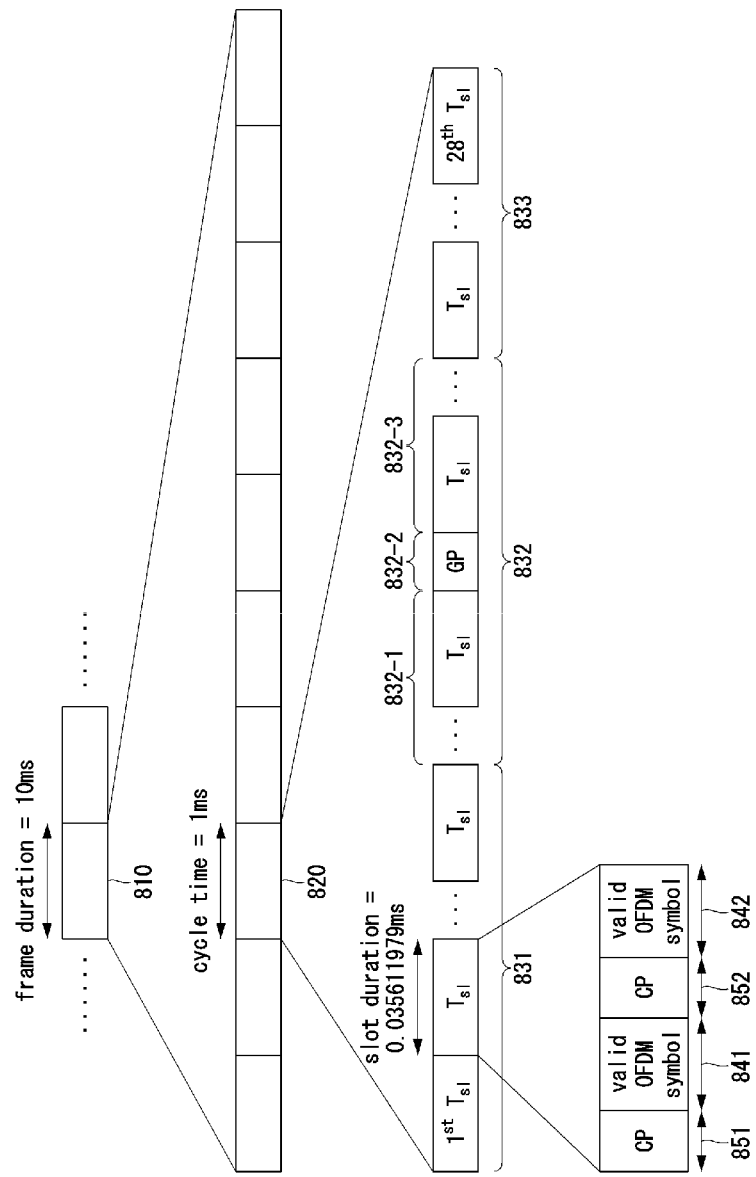
FIG. 10 is a conceptual diagram illustrating a fifth exemplary embodiment of the structure of a frame in a factory automation system.

FIG. 10 is a conceptual diagram illustrating a fifth exemplary embodiment of the structure of a frame in a factory automation system.

The frame structure of FIG. 10 may be similar to the frame structure of FIG. 8. However, the frame structure of FIG. 10 may be a frame structure in which the GP is removed from the frame structure of FIG. 8. The rest of the description of the exemplary embodiment of FIG. 10 may be the same as the description of the exemplary embodiment of FIG. 8.

Figure 11:
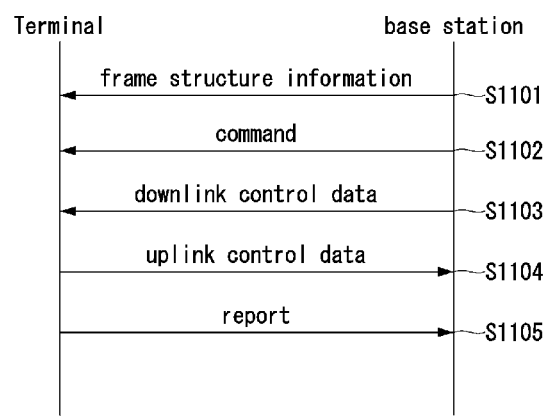
FIG. 11 is a sequence chart illustrating a first exemplary embodiment of a method for operating a frame in a factory automation system.

FIG. 11 is a sequence chart illustrating a first exemplary embodiment of a method for operating a frame in a factory automation system.

Referring to FIG. 11, as a frame operation method in a factory automation system, the base station may transmit frame structure information to the terminal (S1101). In this case, the frame structure information transmitted by the base station to the terminal may be information indicating one of the frame structures shown in FIGS. 6 to 10.

In particular, the frame structure information transmitted from the base station to the terminal may include period information on a command period, an action period, and a report period. In addition, the frame structure information transmitted from the base station to the terminal may include period information on a downlink period, a GP, and an uplink period constituting the action period. Accordingly, the terminal may receive the frame structure information from the base station.

The terminal may obtain the period information on the command period, the action period, and the report period from the received frame structure information. In addition, the terminal may obtain the period information on the uplink period, the GP, and the downlink period constituting the action period from the received frame structure information. Here, the information on each period may be information indicating a starting point and an ending point of each period in the time domain.

Thereafter, the base station may transmit a command signal including a command to the terminal in the command period (S1102). Then, the terminal may receive the command signal from the base station in the command period, and obtain the command from the received command signal. Then, the terminal may perform an action according to the command received from the base station.

On the other hand, the base station may transmit downlink control data for the terminal to access the base station in the downlink period of the action period to the terminal (S1103). Then, the terminal may receive the downlink control data in the downlink period of the action period. In this case, the downlink control data transmitted by the base station to the terminal may include at least one of system control information (e.g., bandwidth information, the number of transmission antennas, downlink physical channel resource scheduling information, uplink physical channel resource scheduling information, time information for absolute synchronization, frame duration information, cycle time information, or application ID), cell search information, physical layer signal, or information for random access. Then, the terminal may receive at least one of the system control information, cell search information, physical layer signal, or information for random access from the base station. Here, in order for the terminal to increase a reception success rate of the downlink control data even in a poor radio fading channel environment, the base station may transmit the same downlink control data every cycle, and the terminal may repeatedly receive them to restore the downlink control data.

Meanwhile, the terminal may transmit uplink control data for accessing the base station in the uplink period after the GP located in the action period (S1104). Accordingly, the base station may receive the uplink control data from the terminal. In this case, the uplink control data transmitted by the terminal to the base station may include at least one or more of system control information, random access information (e.g., random access preamble), physical layer signal, and other uplink control information. The base station may receive at least one of the system control information, random access information, physical layer signal, and other uplink control information from the terminal in the uplink period located after the GP of the action period.

Meanwhile, the terminal may not know what application mode the serving cell provides at the time of initial system access. Accordingly, the base station may broadcast system control information indicating the application mode in the downlink period of the action period. Then, the terminal may receive the system information indicating the application mode from the base station in the downlink period of the action period, and identify the application mode. Also, the base station may transmit a physical layer signal for providing downlink time/frequency synchronization and a cell ID to the terminal in the downlink period of the action period. Then, the terminal may receive from the base station the physical layer signal for providing downlink time/frequency synchronization and the cell ID in the downlink period of the action period.

In addition, the base station may transmit broadcast information for connecting the terminal to a system of the serving cell to the terminal on a physical broadcast channel (BCH) in the downlink period of the action period. Then, the terminal may receive the broadcast information for connecting to the system of the serving cell from the base station in the downlink period of the action period. In addition, the base station may transmit a physical layer signal for providing uplink time synchronization to the terminal in the downlink period of the action period. Then, the terminal may receive the physical layer signal for providing uplink time synchronization from the base station in the downlink period of the action period. In addition, the base station may transmit random access information for accessing the system of the serving cell to the terminal by loading it on a physical channel in the downlink period of the action period. Then, the terminal may receive the random access information for accessing the system of the serving cell from the base station.

In addition, the terminal may perform a random access procedure by transmitting random access information (e.g., preamble) to the base station in the uplink period of the action period. Meanwhile, the terminal may transmit a report on a result of performing the action according to the command of the base station to the base station through a report signal (S1105).

Figure 12:
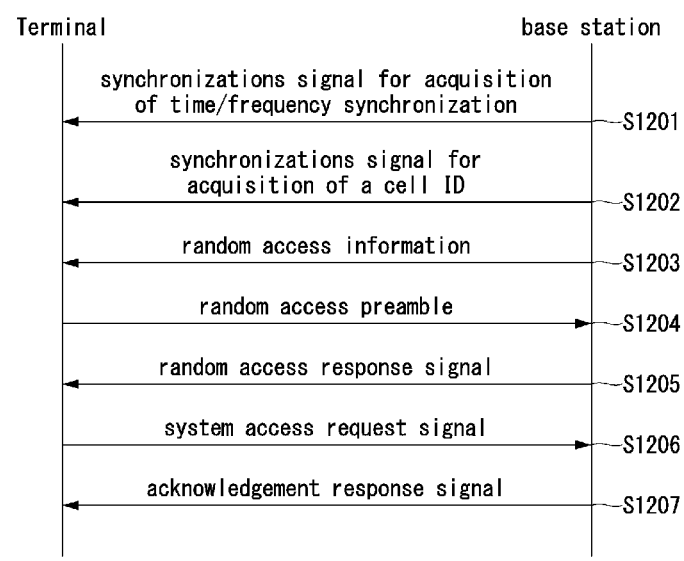
FIG. 12 is a sequence chart illustrating a first exemplary embodiment of a signal transmitted/received between a terminal and a base station in an action period.

FIG. 12 is a sequence chart illustrating a first exemplary embodiment of a signal transmitted/received between a terminal and a base station in an action period.

Referring to FIG. 12, in the downlink period of the action period, the base station may transmit a synchronization signal for acquisition of time/frequency synchronization to the terminal at regular intervals (S1201). Then, the terminal may receive the synchronization signal for acquisition of time/frequency synchronization transmitted at regular intervals from the base station. In addition, the terminal may acquire time/frequency synchronization using the received synchronization signal for acquisition of time/frequency synchronization. Meanwhile, in the downlink period of the action period, the base station may transmit a synchronization signal for acquisition of a cell ID to the terminal (S1202). Then, the terminal may receive the synchronization signal for acquisition of a cell ID from the base station. Then, the terminal may acquire the serving cell ID from the received synchronization signal for cell ID acquisition. The terminal may acquire time/frequency synchronization in this manner, and may perform initial downlink synchronization by acquiring the serving cell ID. Then, in the downlink period of the action period, the base station may transmit random access information to the terminal by using a slot at a time position determined based on the synchronization signal for cell ID acquisition (S1203).

Then, the terminal may select a random access preamble for initial uplink synchronization based on the random access information acquired in the uplink period of the action period, and transmit the selected random access preamble to the base station (S1204). Accordingly, the base station may receive the random access preamble from the terminal. Then, in a downlink period of the next action period, the base station may transmit a random access response signal to the terminal (S1205). Thereafter, the terminal may request a system access to the base station in an uplink period of the next action period. Accordingly, the base station may receive the system access request from the terminal. Then, the base station may transmit an acknowledgment signal indicating that the system access is complete to the terminal in a downlink period of a subsequent action period. Through this process, the terminal may perform the initial uplink synchronization.

After completing the initial downlink and uplink synchronization, the terminal accessing the system may further increase the accuracy of time and frequency synchronization by using physical layer signals received at every cycle time to continuously maintain or improve the synchronization accuracy even in a poor fading radio channel environment.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving, from a base station, information on a command period of a sub-frame, information on an action period of the sub-frame, and information on a report period of the sub-frame;

receiving, from the base station, a command in the command period;
performing an action according to the received command in the action period; and reporting, to the base station, a result according to the action in the report period,
wherein the action period includes an uplink period and a downlink period, the uplink period includes at least one first type slot and at least one second type slot, the downlink period includes the at least one first type slot, and a slot length of the first type slot is longer than a slot length of the second type slot.

2. The operation method according to claim 1, further comprising:
receiving, from the base station, downlink control data for access in the downlink period of the action period; and
transmitting uplink control data for accessing the base station based on the downlink control data in the uplink period of the action period.

3. The operation method according to claim 2, wherein the uplink period includes a transmission direction switching period, and the transmission direction switching period is configured as a guard period.

4. The operation method according to claim 2, wherein the downlink control data includes at least one of first system control information, cell search information, a physical layer signal, or information for random access.

5. The operation method according to claim 4, wherein the first system control information includes at least one of a bandwidth, a number of transmission antennas, resource scheduling information of a downlink physical channel, resource scheduling information of an uplink physical channel, time information for absolute synchronization, information on a frame duration, information on a cycle time, and an application identifier (ID).

6. The operation method according to claim 2, wherein the uplink control data includes at least one of second system control information, random access information, and a physical layer signal.

7. The operation method according to claim 1, wherein the command period includes at least one slot, the action period includes at least one slot and at least one guard period for transmission direction switching, and the report period includes at least one slot.

8. The operation method according to claim 1, wherein the command period includes the at least one first type slot, the action period includes the at least one first type slot, the at least one second type slot, and at least one guard period for transmission direction switching, and the report period includes the at least one first type slot.

9. The operation method according to claim 1, wherein a guard period is configured in a start region or an end region of the sub-frame.

10. The operation method according to claim 1, further comprising:
receiving random access information from the base station in the downlink period of the action period; and
transmitting a random access preamble selected based on the random access information to the base station in the uplink period of the action period.

11. The operation method according to claim 1, further comprising:
receiving, from the base station, a synchronization signal for acquisition of time/frequency synchronization in the downlink period of the action period;
receiving, from the base station, a synchronization signal for acquisition of a cell identifier (ID) in the downlink period of the action period; and
performing downlink synchronization using the synchronization signal for acquisition of time/frequency synchronization and the synchronization signal for acquisition of a cell ID.

12. An operation method of a base station in a communication system, the operation method comprising:
transmitting, to a terminal, information on a command period of a sub-frame, information on an action period of the sub-frame, and information on a report period of the sub-frame;
transmitting, to the terminal, a command in the command period of the sub-frame; and
receiving, from the terminal, a report on a result of an action according to the command, in the report period of the sub-frame,
wherein the action period includes an uplink period and a downlink period, the uplink period includes at least one first type slot and at least one second type slot, the downlink period includes the at least one first type slot, and a slot length of the first type slot is longer than a slot length of the second type slot.

13. The operation method according to claim 12, further comprising:
transmitting, to the terminal, downlink control data for access of the terminal in the downlink period of the action period; and
receiving, from the terminal, uplink control data for access based on the downlink control data in the uplink period of the action period.

14. The operation method according to claim 12, wherein the downlink control data includes at least one of first system control information, cell search information, a physical layer signal, or information for random access, and the uplink control data includes at least one of second system control information, random access information, and a physical layer signal.

15. A terminal comprising:
a processor;
a memory electronically communicating with the processor; and
instructions stored in the memory,
wherein when executed by the processor, the instructions cause the terminal to:
receive, from a base station, information on a command period of a sub-frame, information on an action period of the sub-frame, and information on a report period of the sub-frame;
receive, from the base station, a command in the command period;
perform an action according to the received command in the action period; and report, to the base station, a result according to the action in the report period,
wherein the action period includes an uplink period and a downlink period, the uplink period includes at least one first type slot and at least one second type slot, the downlink period includes the at least one first type slot, and a slot length of the first type slot is longer than a slot length of the second type slot.

16. The terminal according to claim 15, wherein the instructions further cause the terminal to:
receive, from the base station, downlink control data for access in the downlink period of the action period; and
transmit uplink control data for accessing the base station based on the downlink control data in the uplink period of the action period.

17. The terminal according to claim 16, wherein the uplink period includes a transmission direction switching period, and the transmission direction switching period is configured as a guard period.

18. The terminal according to claim 15, wherein the command period includes at least one slot, the action period includes at least one slot and at least one guard period for transmission direction switching, and the report period includes at least one slot.

19. The terminal according to claim 15, wherein the command period includes the at least one first type slot, the action period includes at least one the first type slot, the at least one second type slot, and at least one guard period for transmission direction switching, and the report period includes the at least one first type slot.

* * * * *